3,646,190
METHOD FOR STRIPPING FORMED
ARTICLES FROM A MOLD
Rudolf A. Spyra, Chicago, Ill., assignor to
Seymour C. Graham
Filed Feb. 19, 1969, Ser. No. 800,423
Int. Cl. B29c 7/00
U.S. Cl. 264—297  9 Claims

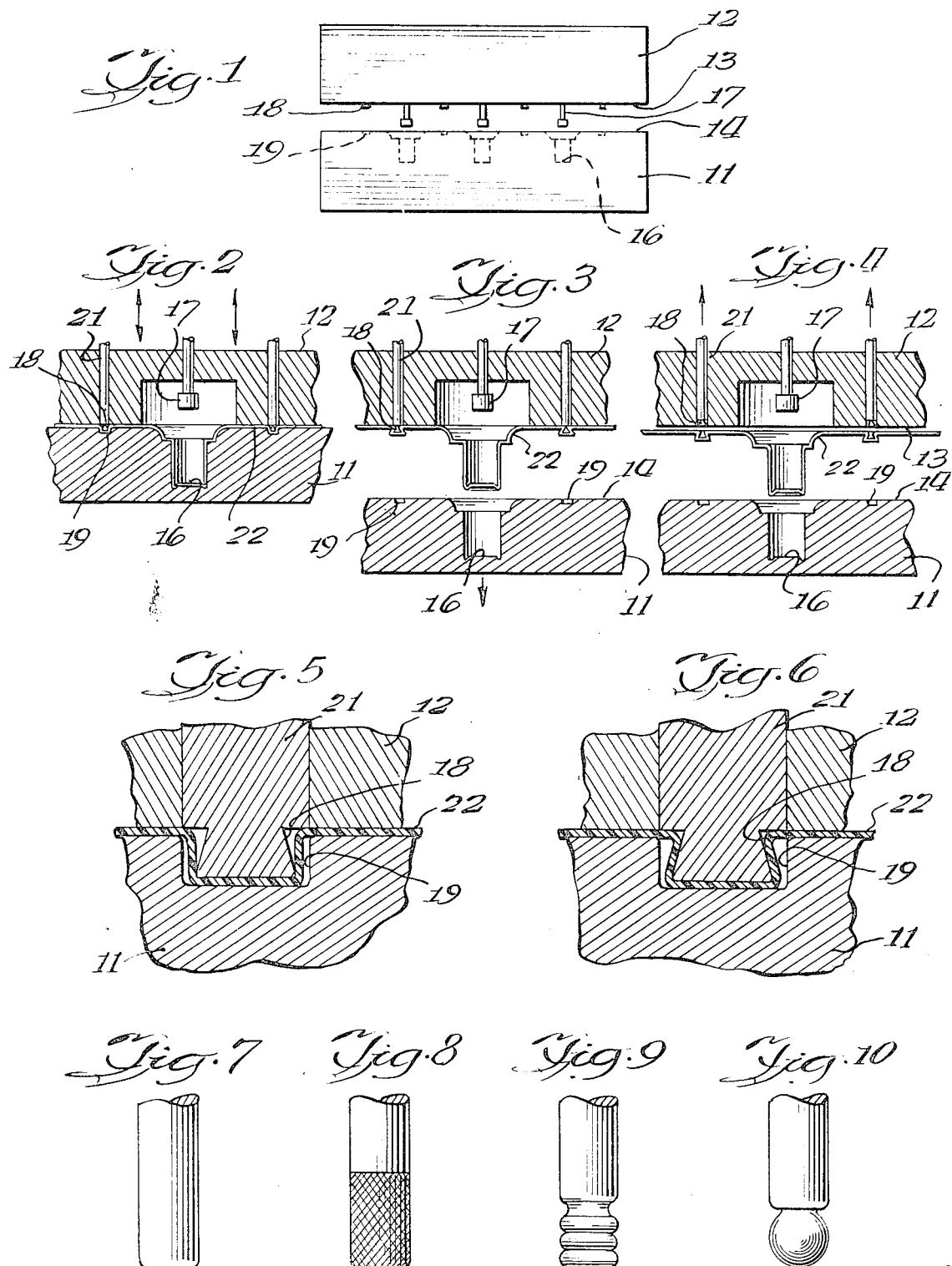

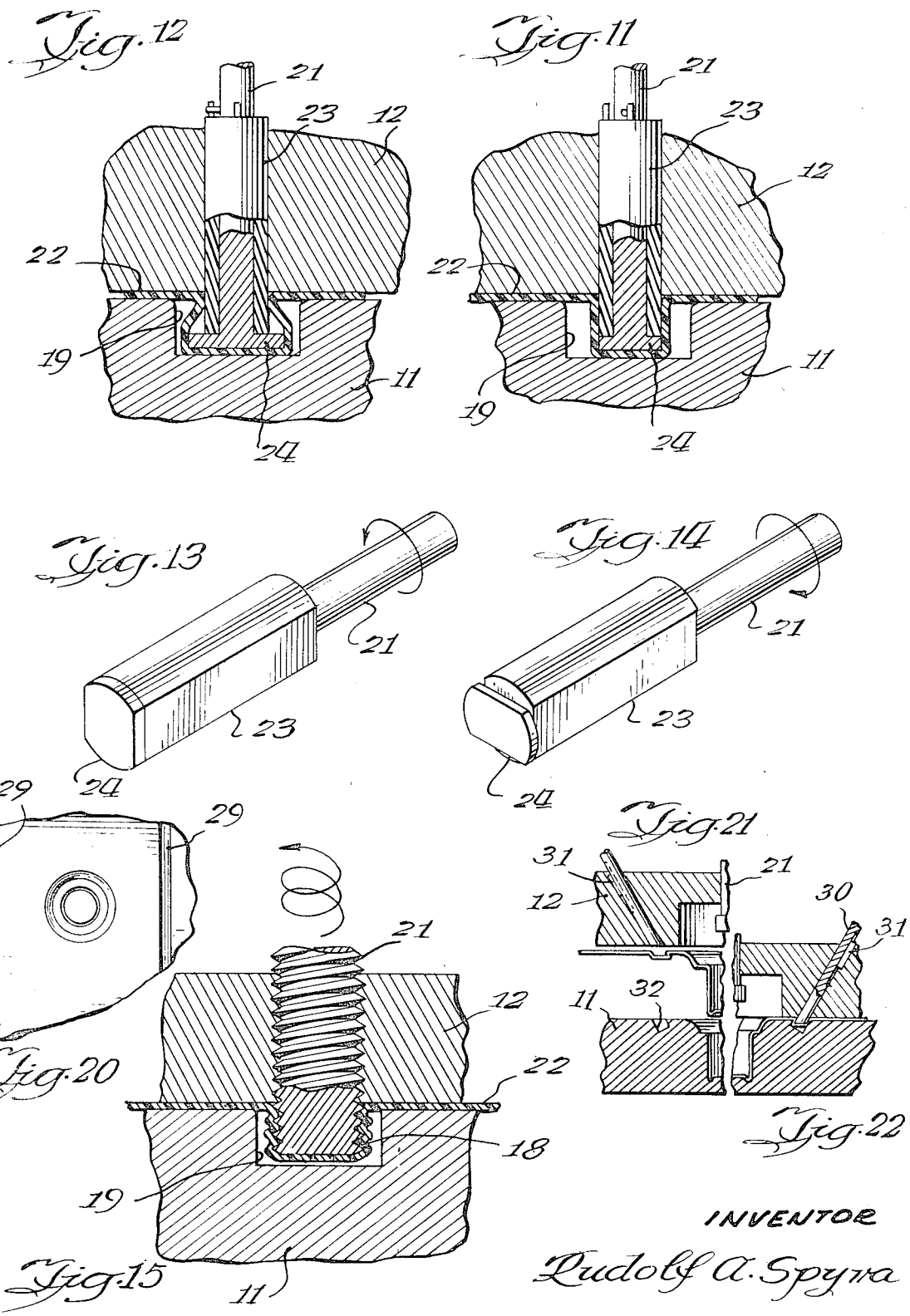

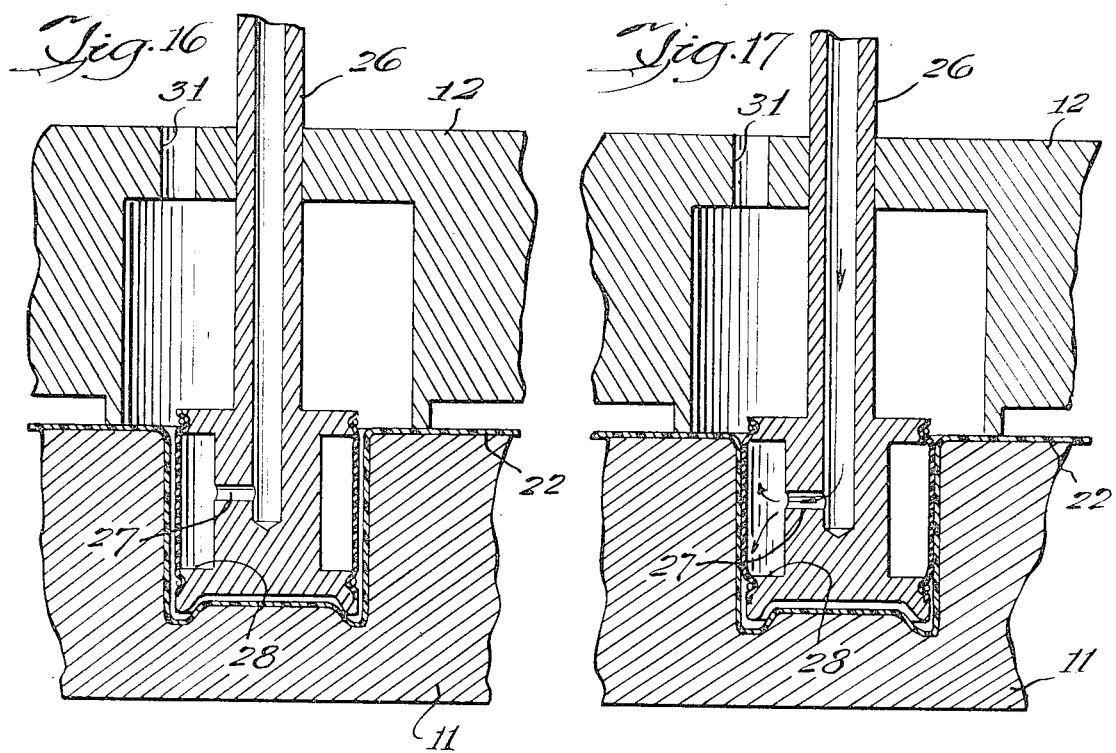
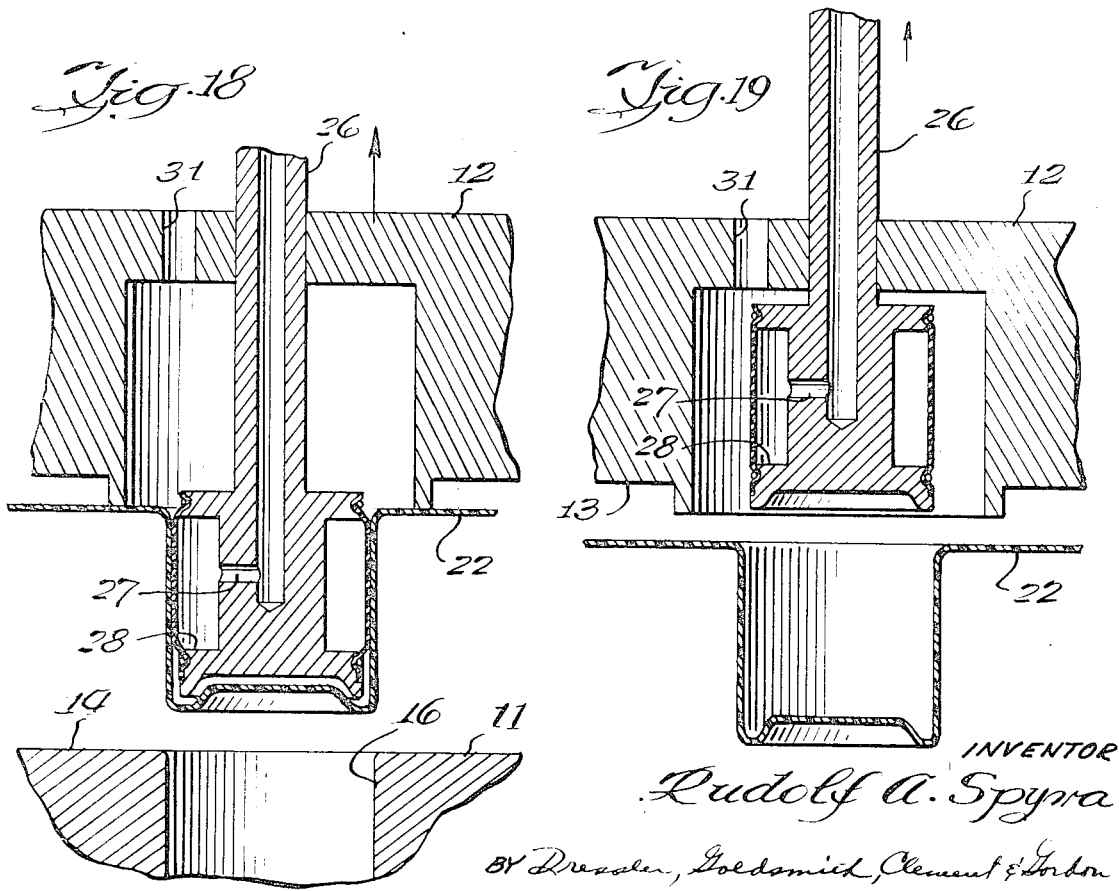

ABSTRACT OF THE DISCLOSURE

Method for the molding of hollow articles, such as containers, from thermoplastic sheet material, and particularly for the separation, or stripping, of the molded thermoplastic sheet material from the mold after the molding operation is completed.

In a mold consisting of a mold plate with one or more cavities for the shaping of containers, and a back-up plate which is held against the mold plate during the shaping operation and thereafter separated from the mold plate for removal of the formed thermoplastic sheet, means are provided for affixing the thermoplastic sheet to the back-up plate so that separation of the back-up plate from the mold plate will result in removal of the thermoplastic sheet from the latter. Means are also provided to thereafter remove the thermoplastic sheet from the back-up plate.

In one aspect of the invention, the thermoplastic sheet is affixed to the back-up plate by adherence of the sheet to projections on the face of the back-up plate. After separation of the back-up plate from the mold plate the projections are retracted into the surface of the back-up plate for easy removal of the thermoplastic sheet therefrom.

In another aspect of the invention, the thermoplastic sheet is affixed to the back-up plate by a plug-assist member which extends into the hollow container and which is expandable against the inner walls of the container to thereby grip the thermoplastic sheet for removal from the mold.

BACKGROUND OF THE INVENTION

This invention relates to the molding of hollow thermoplastic articles such as thermoplastic containers from thermoplastic sheet material, and particularly to the separation of such thermoplastic sheet material from the forming mold after the molding operation is completed.

It is known that thermoplastic hollow articles, such as containers, may be formed from thermoplastic sheet material, such as sheets of polystyrene, by the utilization of a two-piece mold comprising a mold plate with one or more cavities corresponding to the shape of the article, or container, to be made, and a mold back-up plate adapted to be held against the mold plate (with the thermoplastic sheet therebetween) during the molding operation and adapted to be separated from the mold plate for removal of the shaped thermoplastic sheet therefrom.

In such mold systems, there is often difficulty in removing the shaped thermoplastic sheet from the mold plate and mold cavities because there is a substantial amount of surface contact between the shaped thermoplastic sheet and the mold plate which formed it.

The usual means employed to strip hollow articles from the molds in which they are formed involve ejector, or stripper pins within the mold body, or ejector, or stripper plates which are inserted between the molded thermoplastic sheet and the mold. Such systems are complex in construction and often result in distortion of the molded pieces. In addition, time is consumed in removing the shaped thermoplastic sheet which is held tenaciously by the mold so that overall production rates are low.

SUMMARY OF THE INVENTION

In accordance with the present invention means are provided for affixing the molded thermoplastic sheet to the mold back-up plate so that the thermoplastic sheet is withdrawn from the mold when the back-up plate is separated therefrom. After the back-up plate is separated from the mold plate the means used to effect the affixing of the thermoplastic sheet to the back-up plate is removed or counteracted so that the thermoplastic sheet may thereafter be readily removed from the back-up plate.

BRIEF DESCRIPTION OF THE DRAWINGS

The invention, in its various aspects, may be more readily understood by reference to the drawings in which:

FIG. 1 is an overall representation in side elevation of a mold plate and mold back-up plate in separated position, illustrating features of one embodiment of this invention;

FIGS. 2, 3 and 4 are enlarged, detailed cross-sectional drawings showing in successive operational stages a portion of the mold plate of FIG. 1 which includes a single mold cavity together with the corresponding portion of the mold back-up plate;

FIGS. 5 and 6 are further enlarged cross-sectional drawings showing successive stages in the deformation of the thermoplastic sheet by a projection on the surface of the mold back-up plate, and the shrinking of the sheet to conform to the contour of the projection and to thereby provide a means for affixing the thermoplastic sheet to the back-up plate;

FIGS. 7, 8, 9 and 10 illustrate pin ends designed to provide various types of projections from the surface of the mold back-up plates;

FIGS. 11 and 12 are enlarged cross-sectional detail drawings illustrating the action of a projection from the surface of the back-up plate, which projection has an alterable contour to provide affixation or release of the thermoplastic sheet, as desired;

FIGS. 13 and 14 are perspective representations of the pin of FIGS. 11 and 12 in its release and affixing positions, respectively;

FIG. 15 is an enlarged cross-sectional detail of an embodiment of this invention in which a threaded pin is used to provide a projection from the face of the back-up plate and to provide a simple means of retracting the projection, as desired;

FIGS. 16, 17, 18 and 19 are enlarged cross-sectional elevations showing successive stages in the operation of another embodiment of the invention in which the thermoplastic sheet is affixed to the back-up plate at and to a plug-assist member rather than being affixed to the projections on the surface of the back-up plate;

FIG. 20 is a plan view of another embodiment of the mold member in which grooves are provided in its upper surface to receive projections from the mold back-up plates; and FIGS. 21 and 22 are views of still another embodiment of the invention in which the projections located in the back-up plate are disposed at a 45° angle relative to the bottom surface of the back-up plate.

DETAILED DESCRIPTION OF THE INVENTION

Aside from its unique stripping features, the invention contemplates the utilization of conventional two or more piece molding equipment for the formation of molded hollow articles from thermoplastic sheet, as shown in FIG. 1.

Such conventional molding equipment comprises a mold plate 11, and a mold back-up plate 12, the latter being mounted (by means not shown) for reciprocable vertical motion, so that its lower face 13 may be in contact with or out of contact with the upper face 14 of mold plate 11, as desired. The type of mold illustrated is only intended to be exemplary, since it may obviously take many shapes and forms.

In the upper face 14 of mold plate 11 there are a plurality of mold cavities 16, each of which is dimensioned and shaped to conform to the outer surface of the shaped article or container to be molded. Within the mold back-up plate 12 there are a plurality of reciprocable plug-assist members 17, one for each mold cavity 16 and adapted to extend within each mold cavity 16 during the molding operation.

There are also on the lower surface 13 of mold back-up plate 12 a series of projections 18 which are not conventional in mold apparatus and which constitute an essential element in one aspect of this invention, as described in detail hereinbelow. Corresponding to projections 18, there are a plurality of cavities 19 in the upper surface 14 of mold plate 11.

In the molding operation, a pre-heated thermoplastic sheet (not shown in FIG. 1) is inserted between the mold plate 11 and the mold back-up plate 12, and the mold is then closed so that the thermoplastic sheet is tightly held between surfaces 13 and 14 of the back-up plate 12 and mold 11, respectively. At this stage, both the plug-assist members 17 and the projections 18 are retracted and the thermoplastic sheet remains flat.

After the heated thermoplastic sheet is held in place, the molding operation is begun by lowering and plug-assist members 17 into the mold cavities 16, so that the softened thermoplastic sheet begins to be distorted into the desired mold cavity shape. Thereafter, molding of the thermoplastic sheet into mold cavity shape is completed, usually by the application of a vacuum, or suction, to the surfaces of the mold cavity so that the softened thermoplastic sheet material is drawn thereto. Since molding of the thermoplastic sheet material by application of vacuum or suction is conventional, the suction lines leading to mold cavities 16 have been omitted in FIGS. 1, 2, 3, and 4 in the interest of simplicity.

Of course, if desired, the thermoplastic sheet may be molded into the mold cavity shape by the application of gas or air pressure above the thermoplastic sheet just as well as by application of suction below the sheet. Similarly, the molding step may be aided by the utilization of a plug-assist member which is sized and shaped to fit approximately to the walls and bottom of the mold cavity.

Projections 18 are formed by the lowering of rods 21 to deform the softened thermoplastic sheet at locations spaced from the mold cavities. Rods 21 may be lowered before, after, or while the plug-assist members are lowered to start the deformation of the thermoplastic sheet into the mold cavity shape. FIG. 2 shows rods 21 in lowered position deforming the thermoplastic sheet into cavities 19 after the plug-assist member has completed its function and has been retracted from the mold cavity. FIG. 2, shows the thermoplastic sheet 22 deformed into a container shape conforming to mold cavity 16 and deformed about projections 18 for affixing to back-up plate 12.

In FIG. 3, the back-up plate 12 has been separated from mold plate 11, taking with it the deformed thermoplastic sheet 22 affixed to projections 18. In FIG. 4, the pins 18 are retracted to or below the surface of the back-up plate by the raising of rods 21 and the thermoplastic sheet, no longer affixed, is removed from the back-up plate.

The projections 18 may be of any suitable configuration for holding the thermoplastic sheet to the back-up plate, FIGS. 5 and 6, illustrating a tapered configuration wherein the projections have a smaller cross section nearer the surface of the back-up plate than the cross section at levels farther removed from the surface. FIG. 5, shows the deformation of thermoplastic sheet 22 while it is hot and in softened condition between projection 18 and cavity 19; and FIG. 6 shows the same elements after the thermoplastic sheet has cooled to some extent and shrunk against the taper of projection 18 to provide firm affixation.

FIGS. 7, 8, 9 and 10, show alternative configurations for the projections 18, FIG. 7 representing a simple cylindrical tip, FIG. 8 representing a cylindrical tip with a scored or knurled surface, FIG. 9 representing a profiled projection with successive ridges, and FIG. 10 representing a spherical projection.

In another embodiment, illustrated in FIGS. 11, 12, 13 and 14, the projections 18 are of alterable contour to provide for affixation or release of the thermoplastic sheet, as desired. In this embodiment, rod 21 of FIGS. 1 through 10 is located within sleeve 23 and is rotatable. Sleeve 23, as shown in FIGS. 13 and 14 has a cross section greater in one dimension than in the other. Plate 24, at the tip of rod 21 has a cross section of the same size and shape as sleeve 23 and, when it is in the position shown in FIGS. 11 and 13, the plate constitutes, in effect, an extension of sleeve 23. However, when rod 21 is rotated by 90 degrees, plate 24 lies athwart sleeve 23 to provide lateral extensions which help to hold thermoplastic sheet 22.

When the thermoplastic sheet is first deformed by the lowering of rods 21, plate 24 is kept in the position shown in FIGS. 11 and 13, corresponding in cross section to sleeve 23. Rod 21 is then rotated at the position shown in FIGS. 12 and 14 so that the lateral extensions of plate 24 engage and hold thermoplastic sheet 22, as shown in FIG. 12. After the back-up plate is separated from the mold plate, plate 24 is rotated back to the position shown in FIGS. 11 and 13 and rod 21 is retracted to provide for ready release of the thermoplastic sheet.

In the embodiment of FIG. 15, rod 21 is a threaded member, or screw, maintained with a corresponding threaded aperture in back-up plate 12. This provides a threaded surface for projection 18 so that thermoplastic sheet 22 may be held firmly and also provides a ready means of retractability for rod 21 by rotation of the screw.

The embodiment of FIGS. 16, 17, 18 and 19 differs from the embodiments discussed hereinabove in that it does not utilize projections on the face of the back-up plate for affixation of the thermoplastic sheet, but rather uses a modification of the plug-assist member.

In this embodiment the plug-assist member 17 is mounted on reciprocable tubular member 26 which is connected to an air supply. Passage 27 connects the interior of tubular member 26 with external channel 28 which is covered by elastic membrane 29.

In operation, after back-up plate 12 closes onto the thermoplastic sheet 22 which is on the mold plate 11, and after the thermoplastic sheet is deformed into the shape of the mold cavity by the action of plug-assist member 17 aided by compressed air introduced through conduit 31, the elements are in the position shown in FIG. 16. Thereafter, high pressure air is introduced through tubular member 26 and passage 27 to fill the external channel 28 and, as shown in FIG. 17, expand elastic membrane 29 into contact with thermoplastic sheet 22 at the inner walls of the shaped container.

Contact between the expanded membrane 29 and the inner container walls of thermoplastic sheet 22 provides affixation so that when back-up plate 12 is withdrawn from the mold plate, as shown in FIG. 18, the thermoplastic sheet is removed from the mold plate. Suction is then applied to tubular member 26 to retract the expandable membrane from contact with the thermoplastic sheet and thereby release the sheet as shown in FIG. 19.

Referring now to the embodiment illustrating in FIG. 20, there are illustrated a plurality of grooves which are provided in the upper surface of the mold plate 11 in place of the individual cavities 19. These grooves are shown extending in a longitudinal direction, but obviously transverse grooves can also be employed, if desired.

In the embodiment shown in FIGS. 21 and 22, pins 30 are employed, which are disposed at approximately a 45° angle relative to the bottom surface of the back-up plate 12. The pins extend into recesses 32 provided in the upper surface of the mold plate 11. The pins 30 are prevented from rotating by the provision of keys 31. It will be apparent from reviewing the drawings that FIG. 22 shows the mold plate and back-up plate in position to mold the thermoplastic sheet 22, whereas FIG. 21 shows the back-up plate 12 being retracted carrying with it sheet 22 in its formed condition and with the pins 30 retracted to facilitate removal of the sheet 22.

While the invention has been described in its preferred embodiments, it will be apparent to those skilled in the art that changes and variations may be made without departing from the spirit and scope of the appended claims.

What is claimed is:

1. A method of forming a plurality of shaped, molded hollow articles from a flat thermoplastic sheet wherein said sheet is tightly held between a mold means having a plurality of mold cavities to form a plurality of hollow articles and mold back-up means wherein portions of said sheet are distorted out of the plane of said sheet to define a plurality of shaped hollow depressions in said sheet, at least some of said depressions conforming to said mold cavities, and wherein said mold means and back-up means are separated to permit removal of said distorted thermoplastic sheet from said mold means, comprising affixing said distored thermoplastic sheet to said back-up means, a plurality of depressions spaced from said depressions conforming to said mold cavities by gripping the internal side walls of a plurality of said depressions prior to said separation of said back-up means from said mold means, stripping said distorted thermoplastic sheet from said mold means by separation of said back-up means from said mold means while said sheet is affixed to said back-up means, and thereafter releasing said distorted thermoplastic sheet from said back-up means.

2. In the method of forming a shaped, molded hollow article from a flat thermoplastic sheet wherein said sheet is tightly held between a mold means having at least one cavity and a mold back-up means, wherein a portion of said sheet is distorted into the desired hollow article shape be being forced into said cavity and wherein said mold means and back-up means are separated to permit removal of said distorted thermoplastic sheet from said mold means, the improvement which comprises affixing said distorted thermoplastic sheet to said back-up means at a plurality of locations spaced from said cavity prior to said separation of said back-up means from said mold means, stripping said distorted thermoplastic sheet from said mold means by separation of said back-up means from said mold means while said sheet is affixed to said back-up means, and thereafter releasing said distorted thermoplastic sheet from said back-up means, wherein said distorted thermoplastic sheet is affixed to a plurality of projections on the face of said back-up means by forcing said projections into projection receiving means in said mold means and thereby distorting said sheet at said locations, and thereafter shrinking said thermoplastic sheet into close proximity to said projections.

3. The method of claim 2 wherein said distorted thermoplastic sheet is released from said back-up means by retracting said projections.

4. The method of claim 3 wherein said projections are retracted by linear motion.

5. The method of claim 3 wherein said projections are retracted by helical motion.

6. The method of claim 3 in which the projections are disposed at substantially at 45° angle relative to the surface of the back-up means.

7. The method of claim 2 wherein said projections are tapered to provide a smaller cross section nearer the surface of said back-up means than the cross section of said projections at levels farther removed from said surface.

8. The method of claim 2 wherein said projections are of irregular surface to provide improved adhesion between said projections and said distorted thermoplastic sheet.

9. The method of claim 2 wherein said projections are of alterable configuration, wherein lateral extensions are formed on said projections to provide affixation for said thermoplastic sheet to said back-up means and wherein said lateral extensions are removed to permit removal of said thermoplastic sheet from said back-up means.

References Cited

UNITED STATES PATENTS

| | | | |
|---|---|---|---|
| 3,137,905 | 6/1964 | Steinman et al. | 18—2 RP X |
| 3,463,845 | 8/1969 | De Pass et al. | 264—334 X |
| 3,466,355 | 9/1969 | Kostur | 264—334 X |
| 3,470,281 | 9/1969 | Knowles | 264—92 X |
| 3,509,246 | 4/1970 | Borgardt | 264—92 |

FOREIGN PATENTS

| | | | |
|---|---|---|---|
| 387,659 | 5/1931 | Great Britain | 264—334 |

ROBERT F. WHITE, Primary Examiner

A. M. SOKAL, Assistant Examiner

U.S. Cl. X.R.

18—2 RM; 264—92, 93, 322, 334